Jan. 17, 1928.

T. LUND

NAIL

Filed Dec. 27, 1921

1,656,333

INVENTOR.
Thomas Lund
By his Attorney,
Nelson W. Howard

Patented Jan. 17, 1928.

1,656,333

UNITED STATES PATENT OFFICE.

THOMAS LUND, OF BEVERLY, MASSACHUSETTS, ASSIGNOR TO UNITED SHOE MACHINERY CORPORATION, OF PATERSON, NEW JERSEY, A CORPORATION OF NEW JERSEY.

NAIL.

Application filed December 27, 1921. Serial No. 525,080.

This invention relates to metallic fastenings and particularly to tacks and nails such as are used in the manufacture of boots and shoes.

Machines for inserting metallic fastenings are usually provided with a throat having an opening of a size to afford ready passage of the head of the fastenings. When a headed tack or nail is delivered to such a throat-opening, it will at times take up a position with its point adjacent to the circumference of the throat-opening and with its shank at an inclination to the axis thereof, with the result that it will be driven obliquely instead of in the direction of the axis of the throat-opening. A nail so driven will frequently clinch imperfectly. Moreover, a nail assuming this position may be inclined in any direction away from the axis of the throat. Accordingly, its position cannot be controlled with the accuracy necessary for many purposes. For example, in heel seat nailing the nails must be positioned within a very limited space. Otherwise they are likely to hit the lasting tacks previously inserted to hold the upper of the shoe to the insole. Any nail which assumes a position with its shank inclined to the axis of the throat-opening is likely to hit a lasting tack, thus becoming crippled and useless.

It is an object of the present invention to provide a nail which may be inserted by a machine having a cylindrical throat-opening, and which will be self-centering so as invariably and under all circumstances to take up a position in the throat-opening with its shank in alinement with the axis thereof. In the illustrated forms of the nail, this is accomplished by providing the shank of the nail with a plurality of centering fins or flanges each extending from the axis of the shank a distance equal to the radius of the head of the nail.

With this and other objects in view, the invention will now be described in connection with the accompanying drawings and pointed out in the claims.

Figures 1 and 2 present two forms of nail constructed in accordance with the present invention;

Figure 4:
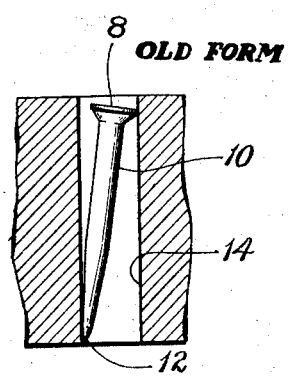
Figs. 4 and 5 illustrate conditions which sometimes occur in driving a headed nail of conventional form.
Figure 5:
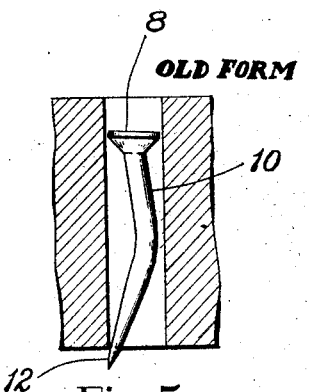

When a nail of usual form, having a head 8 and a shank 10 terminating in a point 12, is driven by a machine having a throat-opening such as 14, there is always a possibility of the nail taking a position with its shank at an inclination to the axis of the throat-opening, as illustrated in Fig. 4. When a nail takes such a position, it will pass obliquely to one side or the other of its intended course, and if the space within which it must be driven is at all circumscribed, as for example by reason of adjacent and previously driven nails, it may hit such previously driven nails. When this occurs, the nail being driven is almost sure to cripple or bend, as illustrated in Fig. 5, and is thus rendered useless.

Figure 1:
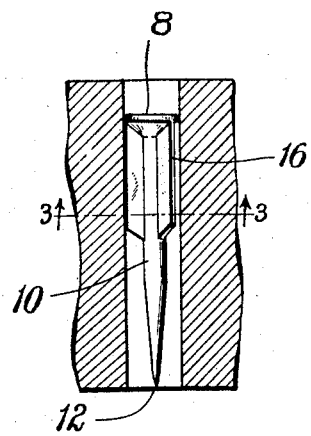
Figure 2:
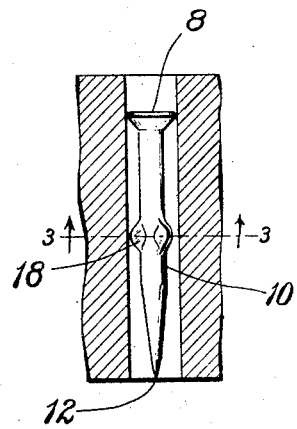
Figure 3:
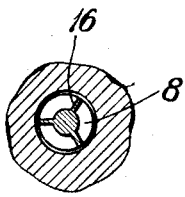
Fig. 3 is a cross-section taken on the line 3—3 of either Fig. 1 or 2.

To overcome this condition, the nails illustrated in Figs. 1 to 3 are provided each with three flanges or fins 16, 18, each flange or fin 16, 18 extending from the axis of the shank of the nail a distance equal to the radius of the head and thus being coextensive radially with the head of the nail. These fins, as shown in Fig. 1 extend, and as shown in Fig. 2 are located, a sufficient distance from the head of the nail to bear against the wall of the throat-opening so as to cause the nail at all times to take a position with the axis of its shank in alinement with the axis of the opening. Moreover the fins 16 or 18 are located (or extend) sufficiently remote from the point of the nail so that they are operative during all or at least a substantial part of the driving operation to support the nail in the throat-opening of the machine. Thus the course which the nail takes when driven is accurately determined, and it can be positioned in close proximity to previously inserted fastenings without danger of colliding therewith.

Having described my invention, what I claim as new and desire to secure by Letters Patent of the United States is:

1. A nail having a head and a shank, and projections from the shank remote from the point of the nail extending from the axis of the nail a distance equal to the radius of the head at a substantial distance from the head.

2. A nail having a circular head, a shank, and a plurality of centering fins formed on the shank and co-extensive radially with the head of the nail.

3. A nail having a head and a shank, and a plurality of fins arranged longitudinally of a portion of the shank remote from the point of the nail and each extending from the axis of the shank a distance equal to the radius of the head at a substantial distance from the head.

4. A nail having a head and a shank, and at least three centering flanges each arranged longitudinally of the shank and extending from the axis of the shank a distance equal to the radius of the head at a substantial distance from the head.

5. A nail having a circular head and a shank, and at least three centering flanges extending from the shank flush with the margin of the head and located remote from the point of the nail.

6. A nail having a head, a shank terminating in a clenching point, and a plurality of semi-circular centering fins extending radially from the shank each to a distance equal to the radius of the head.

7. A nail having a circular head and at least three thin centering fins extending from the axis of the nail a distance equal to the radius of the head at a substantial distance from the head.

8. A nail having a circular head and a plurality of centering fins arranged longitudinally of the nail and extending from the axis of the nail a distance equal to the radius of the head.

9. A nail having a symmetrical head, a shank formed with a clinching point, and a plurality of centering fins formed on the shank and extending from the axis of the shank a distance equal to the radius of the head at a substantial distance from the head of the nail.

In testimony whereof I have signed my name to this specification.

THOMAS LUND.